(12) United States Patent
Contarino, Jr.

(10) Patent No.: US 9,556,653 B2
(45) Date of Patent: Jan. 31, 2017

(54) SADDLE LOCK

(76) Inventor: Alfred F. Contarino, Jr., Boxford, MA (US)

( * ) Notice: Subject to any disclaimer, the term of this patent is extended or adjusted under 35 U.S.C. 154(b) by 664 days.

(21) Appl. No.: 12/910,350

(22) Filed: Oct. 22, 2010

(65) Prior Publication Data

US 2011/0094275 A1 Apr. 28, 2011

Related U.S. Application Data

(60) Provisional application No. 61/253,999, filed on Oct. 22, 2009.

(51) Int. Cl.
| | |
|---|---|
| *E05B 73/00* | (2006.01) |
| *B60R 25/022* | (2013.01) |
| *E05B 65/00* | (2006.01) |
| *B68C 1/00* | (2006.01) |
| *B68C 1/02* | (2006.01) |
| *E05C 19/18* | (2006.01) |

(52) U.S. Cl.
CPC ............ *E05B 73/00* (2013.01); *B60R 25/022* (2013.01); *B68C 1/00* (2013.01); *B68C 1/02* (2013.01); *E05B 65/00* (2013.01); *E05C 19/186* (2013.01); *Y10T 70/5009* (2015.04)

(58) Field of Classification Search
USPC .............. 70/14, 18, 19, 49, 58–62, 209–212
See application file for complete search history.

(56) References Cited

U.S. PATENT DOCUMENTS

| | | | | |
|---|---|---|---|---|
| 3,245,239 | A | * | 4/1966 | Zaidener ............ B60R 25/0221 70/202 |
| 3,664,164 | A | * | 5/1972 | Zaidener ............ B60R 25/0221 70/14 |
| 3,690,131 | A | * | 9/1972 | Davis .................. B60R 25/0221 70/203 |
| 3,780,971 | A | | 12/1973 | De Filipps |
| 4,012,930 | A | * | 3/1977 | Benson ........................... 70/49 |
| 4,372,136 | A | * | 2/1983 | Mickelson ............. E05B 83/10 292/288 |
| 4,667,992 | A | * | 5/1987 | Roden, Jr. ............. E05C 19/003 292/259 R |
| 4,681,134 | A | * | 7/1987 | Paris, Sr. ................ F16K 35/10 137/382 |
| 4,683,729 | A | | 8/1987 | Rogers |
| 4,792,168 | A | * | 12/1988 | Kardosh ....................... 292/288 |
| 4,823,568 | A | | 4/1989 | Rogers et al. |
| 4,956,982 | A | * | 9/1990 | Valley ............................. 70/59 |
| 5,022,697 | A | * | 6/1991 | Hettwer ................... B60P 1/43 280/783 |
| 5,082,213 | A | * | 1/1992 | Torres ..................... B64C 13/04 244/224 |
| 5,101,985 | A | | 4/1992 | Pasban-Dowlatshahi |
| 5,145,222 | A | * | 9/1992 | Meyer .................... E05B 67/36 292/218 |
| 5,339,610 | A | | 8/1994 | Mondry |
| 5,340,172 | A | * | 8/1994 | Sweet ....................... 292/259 R |
| 5,419,165 | A | * | 5/1995 | Perkins ............................ 70/14 |
| 5,639,001 | A | * | 6/1997 | Brady ..................... B62J 11/00 224/416 |
| 5,706,680 | A | * | 1/1998 | Wroble ................ A63C 11/004 211/4 |

(Continued)

*Primary Examiner* — Christopher Boswell
(74) *Attorney, Agent, or Firm* — Saul Ewing LLP

(57) ABSTRACT

The invention is a saddle lock that is inexpensive to manufacture and can be used with different style and/or size saddles.

15 Claims, 8 Drawing Sheets

(56) References Cited

U.S. PATENT DOCUMENTS

| | | | | |
|---|---|---|---|---|
| 5,765,416 | A * | 6/1998 | Cote | 70/238 |
| 5,832,754 | A * | 11/1998 | McKenzie | 70/58 |
| 5,953,941 | A * | 9/1999 | Freund | B60R 25/0221 180/90 |
| 6,263,709 | B1 * | 7/2001 | Kemery et al. | 70/14 |
| 6,311,530 | B1 * | 11/2001 | Woodward | E05C 19/186 70/159 |
| 6,553,797 | B2 * | 4/2003 | Witchey | B60R 25/00 70/200 |
| 6,622,536 | B1 * | 9/2003 | Fuller | F16K 35/10 137/385 |
| D481,614 | S * | 11/2003 | Onel | D8/331 |
| 6,829,914 | B2 * | 12/2004 | Bullock | 70/14 |
| 6,834,896 | B2 * | 12/2004 | Smith | 70/14 |
| 7,201,025 | B2 * | 4/2007 | Mahre et al. | 70/18 |
| 7,234,617 | B2 | 6/2007 | Weaver et al. | |
| 7,278,663 | B2 * | 10/2007 | Witchey | E05B 67/38 292/259 R |
| 7,325,424 | B1 | 2/2008 | Wolf, III | |
| 7,681,421 | B2 * | 3/2010 | Cannon | E05C 19/003 200/43.14 |
| 2002/0185830 | A1 | 12/2002 | Oliver | |
| 2004/0032101 | A1 | 2/2004 | Oliver | |
| 2005/0262904 | A1 * | 12/2005 | Ling et al. | 70/49 |
| 2007/0033971 | A1 * | 2/2007 | Nasin | E05C 19/003 70/14 |
| 2008/0099350 | A1 | 5/2008 | Duncan | |

\* cited by examiner

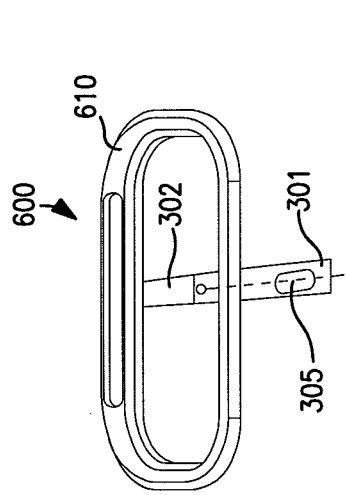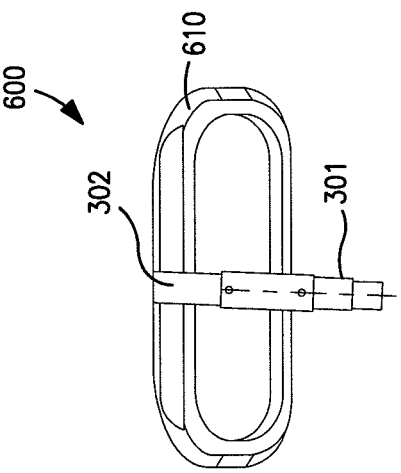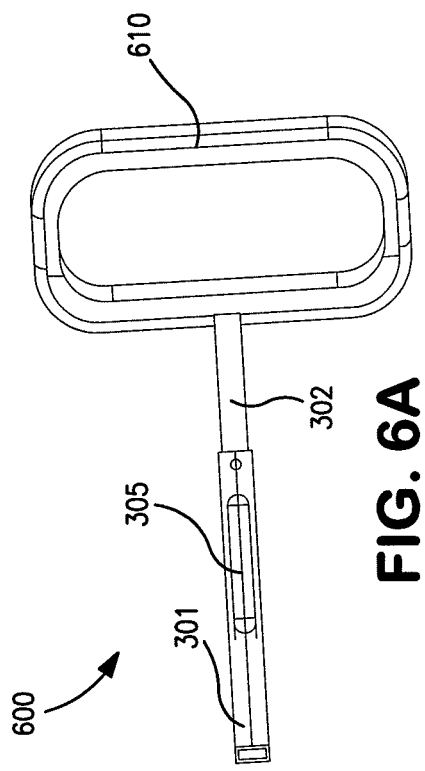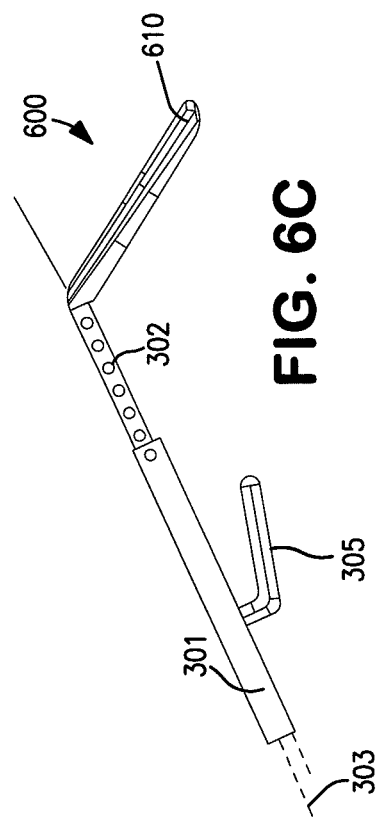

US 9,556,653 B2

SADDLE LOCK

RELATED APPLICATION

This application claims priority to U.S. Provisional Patent Application No. 61/253,999 filed Oct. 22, 2009, the disclosure of which is incorporated herein by reference.

BACKGROUND OF THE INVENTION

Field

The invention pertains to saddle locks. More particularly, the invention pertains to a saddle lock that is simple and inexpensive to manufacture, easy to transport, and can be used to lock a Western saddle or an English saddle.

Background

One of the most expensive pieces of equipment that a horse riding enthusiast has is a saddle. Whether the saddle is English style or Western style, it is typically quite expensive, with prices commonly of many thousands of dollars. These saddles are often left in tack rooms at barns and riding establishments, where they can easily be stolen. Also, equestrians often need to travel with their saddles, putting them in the backs of pickup trucks or carrying them to horse shows or rodeos, etc, where they can be easily accessed by others. Due to their significant value, portability, and usage in public places, saddle theft is a common problem.

SUMMARY OF THE INVENTION

The invention relates to a saddle lock for locking a horse saddle to an immovable object and/or at least so that it cannot be removed from the saddle lock without destroying the saddle. The saddle lock comprises two collinear bars, one slidable relative to the other, each with a hook or other formation at the lateral end thereof that can be fitted around a portion of a saddle. A first one of the bars is hollow, defining an internal longitudinal channel therein and a second one of the bars is narrower than the first bar and adapted to slide in the channel within the first bar so that the overall device can be lengthened and shortened as needed. The two bars have formations along their lengths that can be aligned with each other and then locked in alignment to lock the device at a length of the user's choosing.

In use, one would unlock the device and lengthen it to spread the two hooks apart far enough to place one hook over one end of a saddle and the other hook over the opposing end of the saddle and then shorten the device so that the distance between the ends of the hooks is less than the length of the saddle. The device would then be locked at this length so that the saddle could not be separated from the device without destroying the saddle.

The mechanism for locking the device at a specific length could be as simple as a padlock in conjunction with a series of holes on each bar that can be aligned with each other so that a shackle of a padlock can be passed through two aligned holes (one on each bar) and locked.

Alternately, a chain may be passed through aligned holes on the two bars and then the chain may be locked to an immovable object using a padlock.

BRIEF DESCRIPTION OF THE DRAWINGS

FIGS. 6A through 6D show top, front, side, and rear views, respectively, of a saddle lock in accordance with another embodiment of the present invention.

DETAILED DESCRIPTION OF THE INVENTION

One of the problems with the state of the art of saddle locks is that there are at least two types of saddles, English style saddles and Western style saddles, each having its own general shape, making it difficult to design a saddle lock that is small, lightweight, and portable that can be used to lock an English style saddle or a Western style saddle.

Figure 1:
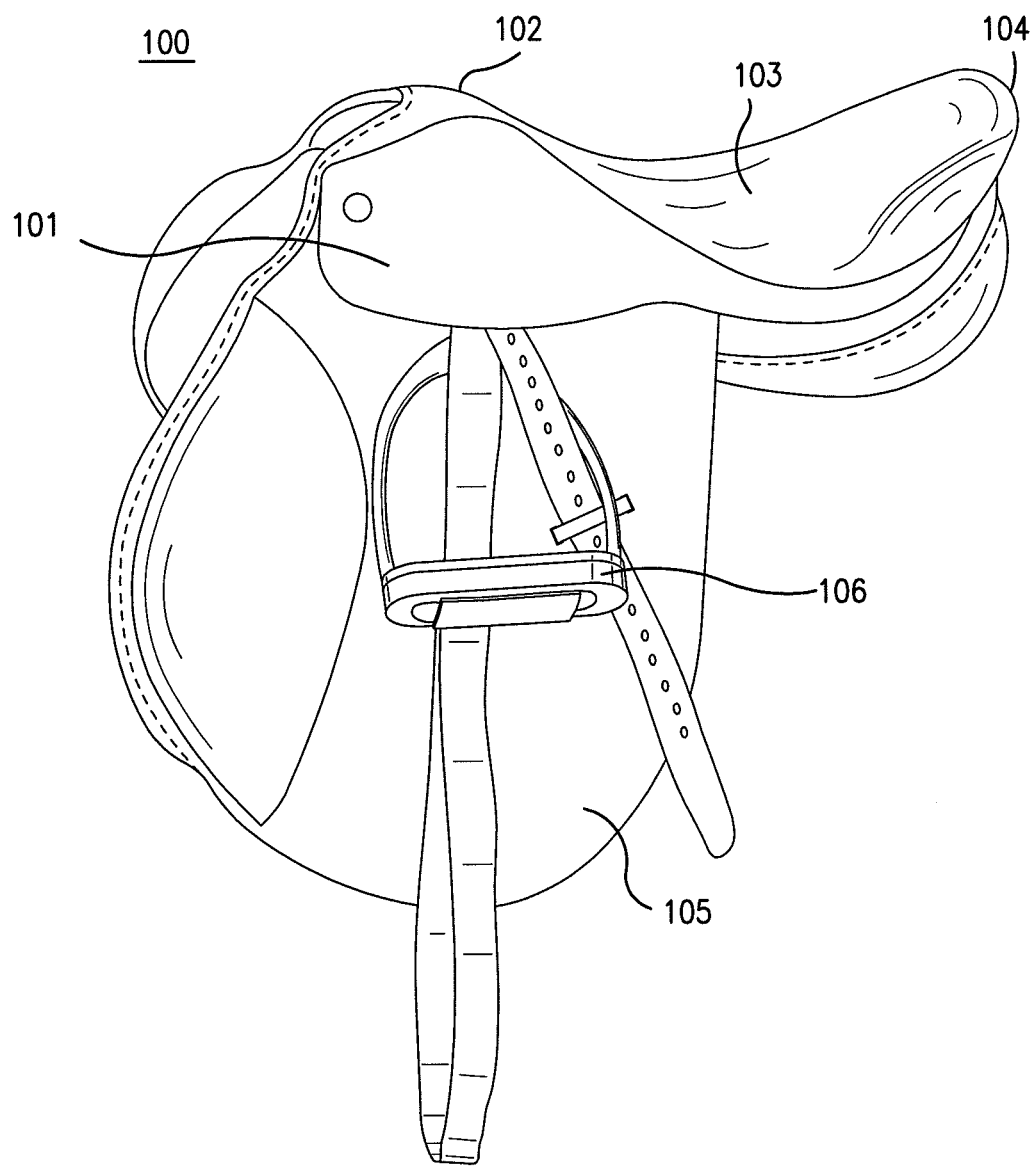
FIG. 1 is a side view of an English style saddle.

FIG. 1 is a side view of a typical English style saddle 100. It comprises a skirt 101 comprised of a pommel 102 at the front, a seat 103, and a cantle 104 at the rear, collectively forming the top of the saddle that rests on top of the horse's back. Hanging down from each side of the skirt 101 is a saddle flap 105, and a stirrup assembly 106.

Figure 2:
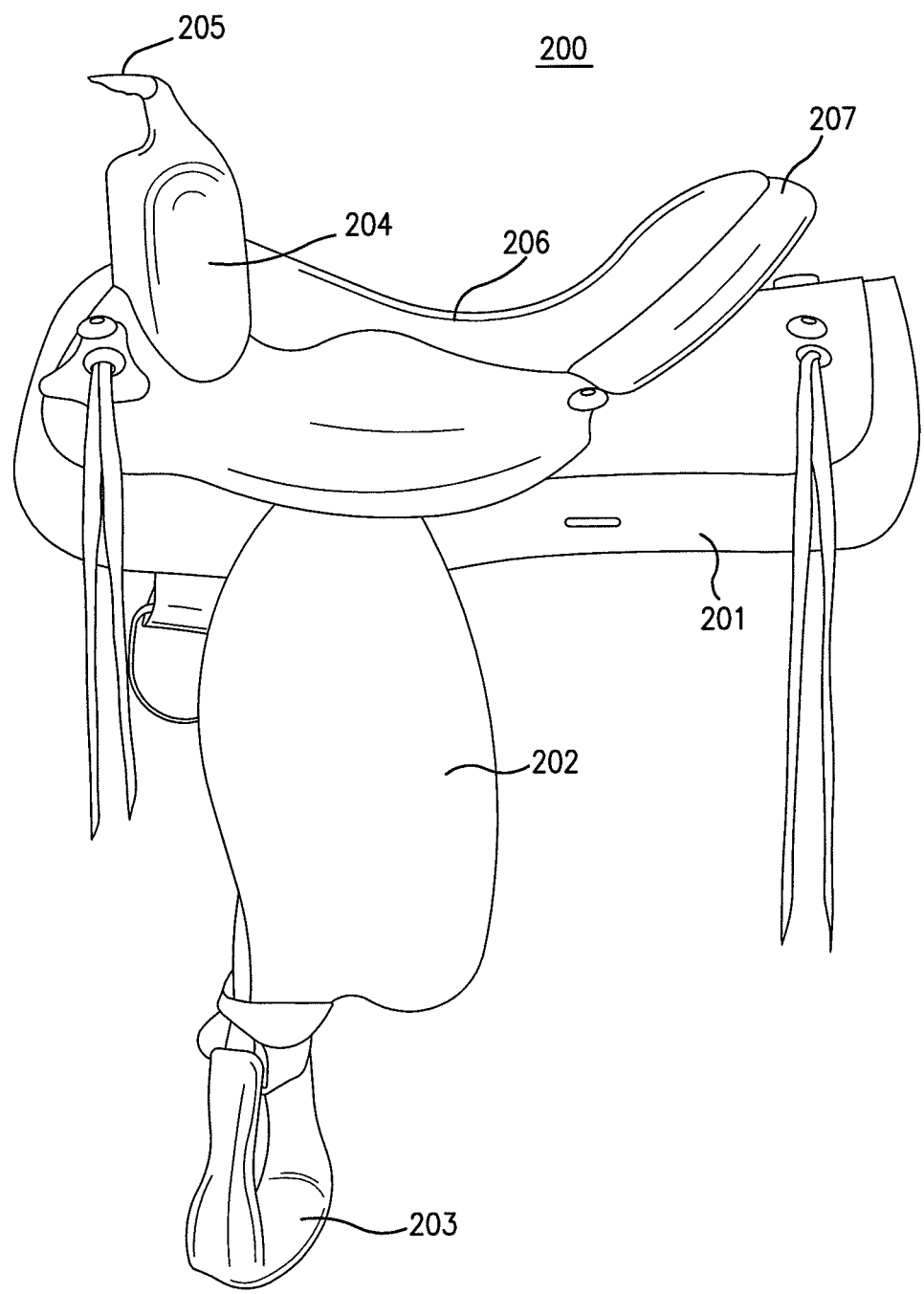
FIG. 2 is a side view of a Western style saddle.

FIG. 2 is a side view of a typical Western style saddle 200. A Western style saddle also comprises a skirt 201 that sits on top of the horse's back. The skirt of a Western saddle also comprises a seat 206 and cantle 207. However, it does not have a pommel at the front of the skirt. Rather, the most significant distinction between a Western saddle and an English saddle is that a Western saddle has a prominent swell 204 that extends upwardly from the front of the skirt with a horn 205 on top that a rider can grasp with his or her hand.

On a Western saddle, a fender 202 hangs down the side of the horse on each side of the skirt 201 with a stirrup 203 extending from the bottom of each fender 202.

The swell and horn give the Western saddle a significantly different shape than an English saddle.

The present invention is a saddle lock that is small, lightweight, easy to transport and simple to operate and that can be used to lock either a Western saddle or an English saddle.

Figure 3:
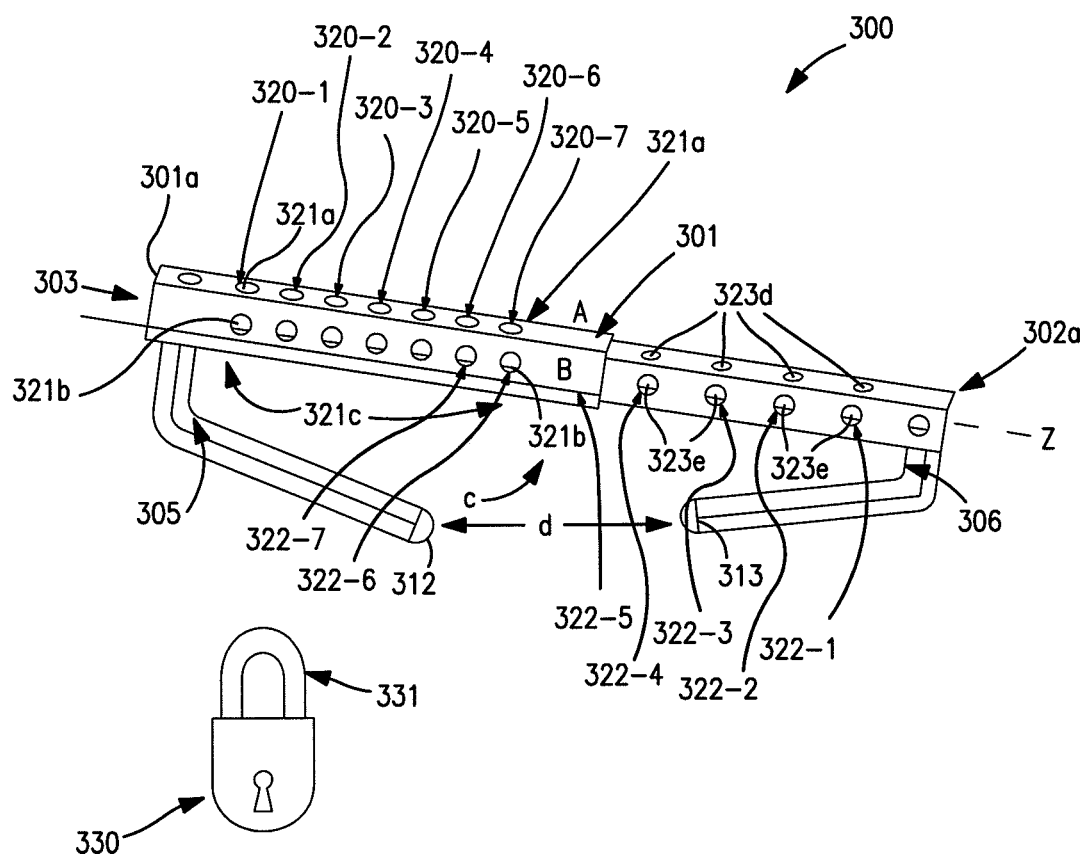
FIG. 3 perspective view of an exemplary saddle lock in accordance with the principles of the present invention.

FIG. 3 is a perspective view of an exemplary embodiment of a saddle lock 300 in accordance with the principles of the present invention. It comprises a first, outer bar 301 and a second, inner bar 302. Preferably, the bars are made of a strong material such as a metal that cannot be easily bent, fractured or otherwise deformed or destroyed.

The two bars are adapted so that the two bars can be assembled collinearly with each other with the second bar 302 slidable within a longitudinal bore 303 in the first bar 301. All directional references herein refer to the longitudinal direction of the two collinear bars of the assembled device unless otherwise stated or otherwise obvious from the context.

A first formation, such as a first hook 305, extends from the longitudinal end 301a of the first bar with at least a portion of the first formation medial (i.e., closer to the longitudinal center of the device 300) of the longitudinal end 301a of the first bar 301. For instance, the end 312 of the first hook 305 is medial of the longitudinal end 301a of the first bar 301. A second formation, such as a second hook 306, extends from the longitudinal end 302a of the second bar 302 with at least a portion of the second formation medial of the longitudinal end 302a of the second bar 302. For instance, the end 313 of the second hook 306 is medial of the longitudinal end 301a of the second bar 302.

Both bars 301, 302 in this example are square bars (i.e., they have a square cross-section). However, this is merely exemplary. The bars can have virtually any cross-sectional shapes as long as the second bar can slide relatively freely within the first bar. Preferably, the outer circumference of the inner bar is shaped substantially the same as the inner circumference of the outer bar and with a fairly tight clearance between each other so that the bars can easily slide longitudinally relative to each other, but the inner bar cannot move significantly in a direction transverse to the longitudinal direction (i.e., the inner bar cannot rattle around significantly inside of the outer bar, but can slide longitudinally).

The two bars may be cylindrical so that they can rotate about their longitudinal axes relative to each other. However, as will become clear in the discussion below, if the two bars are not cylindrical (so that they cannot rotate relative to each other about their longitudinal axes), this may be advantageous because it can be used to keep the holes (or other formations) on the first bar rotationally aligned with the holes (or other formations) on the second bar (i.e, rotationally about the longitudinal axes of the bars).

The two bars 301, 302 have formations thereon that permit the two bars to be locked to each other at a plurality of different longitudinal positions relative to each other. Generally, one of the bars would have a plurality of such formation disposed at different longitudinal positions along the length of the bar and the other bar would have at least one mating formation. However, both bars may have multiple such formations, as in the illustrated embodiment, In the illustrated embodiment, the formations are holes through the bars. This is merely exemplary; although, holes are considered to be a particularly inexpensive embodiment since they are extremely inexpensive and easy to form in a bar. Furthermore, the formations on the first bar may be different than the formations on the second bar, so long as they enable the locking of the two bars to each other longitudinally.

As seen, in this embodiment, the outer bar 301 has a series of radially directed through holes therein distributed at different longitudinal positions along the length, l, of the bar. In the embodiment shown in FIG. 3, the bar 301 has a square profile with four faces A, B, C, and D and there are seven (7) such longitudinal positions 320-1 through 320-7 on the outer bar 301, each consisting of three longitudinally aligned holes 321a, 321b, 321c, with a first through hole 321a on face A, a second through hole 321b on the adjacent face B, and a third through hole 321c on face C for each longitudinal position 320-1 through 320-7. There are no holes in face D of outer bar 301

The inner bar 302 also is square, having faces E, F, G and H and has at least one pair of through holes 323e and 323f in faces E and F, respectively. No holes are provided in faces G and H of inner bar 302. In the illustrated example, the inner bar 302 also has seven (7) such hole pairs 323e and 323f disposed at seven different longitudinal positions 322-1 through 322-7 along the length of the bar. Only the first four of the longitudinal positions 322-1 through 322-4 and the corresponding holes 323e and 323f are visible in FIG. 3, since the last three positions 322-5 through 322-7 are positioned within the outer bar 302 with the bars positioned in the relative longitudinal position illustrated in FIG. 3.

All of the holes on both bars 301, 302 in FIG. 3 are round and identical. Both features are merely exemplary. The hole(s) on the inner bar should be alignable with the hole(s) on the outer bar so that a chain or a shackle of a padlock can be passed through the aligned through holes on the two bars to lock the bars to each other in a fixed longitudinal position.

From FIG. 3, it should be apparent that the inner bar 302 can be slid in the channel 303 in the outer bar 302 to a multiplicity of longitudinal positions in which the holes 323e and 323f corresponding to at least one of the longitudinal positions 322-1 through 322-7 on the inner bar 302 is longitudinally aligned with the holes 321a-321c corresponding to one of the longitudinal positions 320-1 through 320-7 on the outer bar 301. When any one hole on the inner bar is aligned with any one hole on the outer bar, a chain (not shown) or a shackle 331 of a padlock 330 can be passed through the aligned holes to lock the two bars together so that they can no longer slide longitudinally relative to each other.

Figure 4:
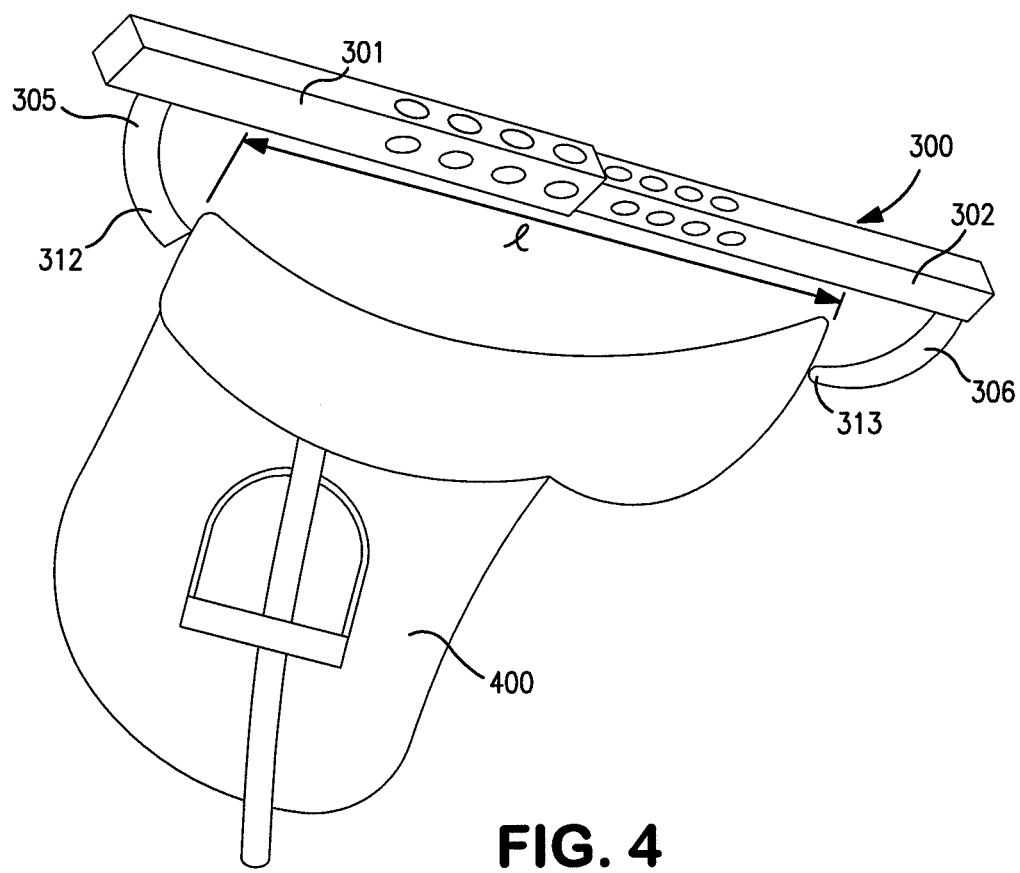
FIG. 4 is side view of the saddle lock of FIG. 3 being used to lock an English style saddle.

In operation, a user can slide the two bars 301, 302 longitudinally relative to each other to increase the distance, d, between the ends 312, 313 of the two hooks 305, 306 to a distance greater than the length of the particular saddle that is to be locked. The device 300 can be slipped over the English style saddle 400 as shown in FIG. 4. Then, the two bars 301, 302 may be slid medially relative to each other to decrease the distance, d, between the ends 312, 313 of the two hooks 305, 306 until the distance between the ends of the two hooks is less than the length, l, of the saddle. At any position where the distance between the ends 312, 313 of the hooks 305, 306 is less than the length, l, of the saddle and the holes 321a, 321b, 321c corresponding to at least one of the longitudinal positions 320-1 through 320-7 on the outer bar 301 align longitudinally with the hole 323e, 323f corresponding to one of the longitudinal positions 322-1 through 322-7 on the inner bar 302, the shackle 331 of the padlock 330 can be inserted through the mating holes and locked so that the saddle 400 and the saddle lock 300 cannot be separated from each other without unlocking the padlock 330. Specifically, in this particular embodiment, if the bars 301, 302 are longitudinally set as shown in FIG. 3, then the shackle 331 of the padlock 330 may be passed through the holes 323a and 323b of longitudinal position 320-7 on the outer bar 301 and holes 323e and 323f of longitudinal position 322-6 on the inner bar 302. It also should be apparent that there is another pair of longitudinal positions (and their corresponding holes) on the two bars that could have been selected for passing the shackle 331 through for this particular selected length of the saddle lock 300. Particularly, the padlock 330 alternately could have been inserted through the holes 321a, 321b corresponding to longitudinal position 320-6 on outer bar 301 and holes 323e, 323f corresponding to longitudinal position 320-7 on inner bar 302. At shorter lengths of the device 300, there would be even more options.

The saddle 400 is unusable while the saddle lock 300 is locked to it and, therefore, of no value to anyone other than the owner who has the key (or combination) to the padlock. Without the key to the padlock, the saddle 400 would have to be destroyed to remove it from the locking device 300.

Alternately, to provide added security, a chain (not shown) rather than a padlock may be passed through the mating holes on the two bars and the chain may be locked (e.g., using the padlock) to an immovable object so that, not only is the saddle unusable while locked, but also unmovable.

Figure 5:
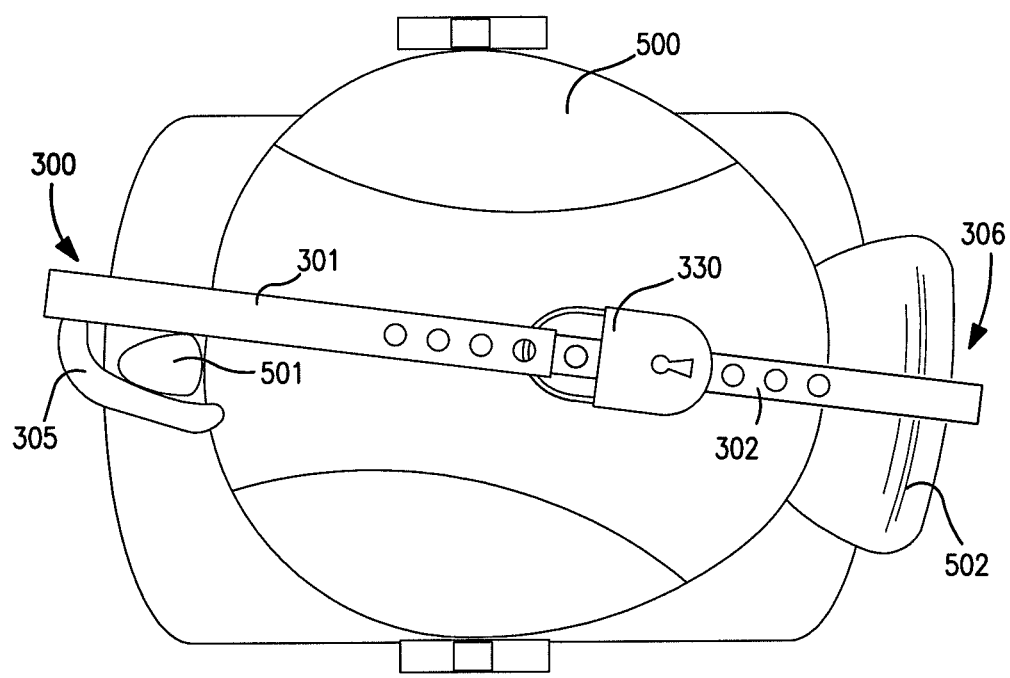
FIG. 5 is top view of the saddle lock of FIG. 3 being used to lock a Western style saddle.

In addition, since there are three holes 321a through 321c in three different faces, A-C, respectively, of the square outer bar 301 for each longitudinal position, the square inner bar 302 may be inserted into the outer bar 301 in two different rotational orientations relative to the outer bar and still provide mating sets of holes on the inner and outer bars through which a padlock or chain can be inserted to lock the length of the device 300. This is advantageous because it will allow the user to select two different possible relative rotational orientations (about the longitudinal axis z of the bars 301, 302) of the hooks to each other. Thus, the illustrated embodiment is particularly adapted to allow the device 300 to be used to lock either a Western style saddle or an English style saddle. For instance, if one were to remove the inner bar from engagement with the outer bar, rotate the inner bar 90 degrees clockwise about its longitudinal axis and re-insert it into the outer bar as illustrated in FIG. 5, then hook 305 and hook 306 would now be oriented at a 90° angle to each other about the longitudinal axis z of the device 300. Furthermore, with reference again to FIG. 3, in this orientation, the holes on faces B and C of the outer bar 301 (rather than holes in faces A and B in the rotational orientation illustrated in FIGS. 3 and 4) would align with the holes on faces E and F of the inner bar, so that the two bars could still be locked longitudinally to each other with a padlock or chain.

Accordingly, the device 300 also can be use to lock a Western style saddle 500 as illustrated in FIG. 5 by placing one of the hooks 305 sideways around the swell or horn 501 of the saddle, with the other hook 306 extending in a direction 90° from the direction of hook 305 and positioned around the cantle 502 of the saddle 500 (just as was the case for the English style saddle 400).

If the two bars alternately are cylindrical so that they can rotate relative to each other without removing the inner bar from the bore in the outer bar, then the two bars would not even need to be separated from each other in order to rotate the two bars relative to each other about their longitudinal axes to change the relative rotational orientation of the two hooks. However, with a cylindrical embodiment, the user would need to manually align the two bars both longitudinally and rotationally to align the necessary holes before inserting the padlock or chain. However, one advantage of non-cylindrical bars is that once the inner bar is inserted into the bore in the outer bar properly, the holes in the bars essentially will be automatically rotationally aligned with each other.

On the other hand, cylindrical bars can be employed in association with mating formations on the two bars other than holes that can be locked to each other without the need for any particular rotational orientation of the two bars to each other. Such mating formations, for instance, may comprise a plurality of radial indents around the inner bar at various longitudinal positions and a dead bolt lock incorporated directly into the outer bar with a bolt that can be extended into the indents on the inner bar. However, these more complex embodiments will add significant cost to manufacturing of the device.

If a hole is provided on each face of at least one of the non-cylindrical bars so that there is a finite number of possible rotational orientations in which the inner bar may be inserted into the outer bar, then the bars will be lockable no matter which one of those possible rotational orientations is selected. For instance, in the square embodiment illustrated in FIG. 3, if a hole is provided in each of the four faces of the bar for each longitudinal position of at least one of the bars, then the two bars can be rotationally oriented relative to each other and longitudinally locked in any of the four possible rotational orientations (namely, every 90° of rotation). If the two bars have equilateral triangular cross sections (with a hole in each of the three faces for each longitudinal position), then they can only be positioned relative to each other in three (3) possible orientations (120° apart). Rectangular bars would have only two (2) orientations (180° apart). Equilateral hexagonal bars would have only six (6) possible orientations relative to each other (every 60° of rotation).

Of course, not every possible rotational orientation may place the two hooks in a desirable rotational orientation to each other. Thus, care still should be taken to choose a suitable rotational orientation of the two bars in such embodiments.

The invention provides an extremely compact, and inexpensive to manufacture saddle lock that can be used to lock different style saddles, including Western style saddles and English style saddles.

In more complex embodiments and to provide added safety, the device can be provided with a mechanism that prevents the inner bar from coming out of the outer bar so that a user cannot accidentally drop one of the bars. Certainly, persons of ordinary skill in the related arts are well aware of many available configurations and mechanisms, such as those used in any number of telescoping devices (such as telescopes, spyglasses, and variable-focal-length camera lenses) that permit such longitudinal movement. Preferably, such a mechanism would still allow the two bars to be rotated relative to each other. For instance, as previously discussed, if the two bars are cylindrical, they can be rotated relative to each other without the need for the two bars to be separable. Alternately, at least one of the hooks may be rotatably attached to its respective bar so that the bars per se do not need to rotate relative to each other. Even further, embodiments in which a non-cylindrical inner bar may be removed from the bore in the outer bar without the two bars being completely unattached to each other are easily envisioned.

However, all of these additional features add significant manufacturing cost as compared to the illustrated embodiment, which can be manufactured extremely inexpensively from steel bar of different sizes with holes drilled therein.

In all of the embodiments discussed hereinabove, one bar slides in a bore in the other bar. However, even this is exemplary. The two bars may be kept longitudinally aligned by other means, such as one bar sliding in an open channel in the other bar. In fact, it is not even necessary that the device have a means to keep the two bars longitudinally aligned, as this can be done manually by the user. The two bars may be as simple as two identical bars of rectangular cross section with holes drilled there through.

FIGS. 6A through 6D show top, front, side, and rear views, respectively, of a saddle lock 600 in accordance with another embodiment of the present invention. The design of this embodiment is substantially similar to the design of the embodiment of FIGS. 3-5 except that the second hook 306 is replaced with a loop 610. Most of the remaining features of this embodiment are similar to those of the embodiment of FIGS. 3-5 and have been labeled with the same reference numerals. The loop 610 is designed to fit completely around the cantle 104 or 207 of the saddle 100 or 200 and, depending on the particular saddle, may provide a more secure locking of the saddle than hook 306. The plane of the loop is at an obtuse angle to the longitudinal axis 303 of the bars. This also may provide a more secure fit to the saddle, depending on the particular saddle. In the illustrated embodiment, the loop 610 is rigid. However, in other embodiments it may be flexible, comprising, for instance, a chain or a steel cable.

Figure 7:
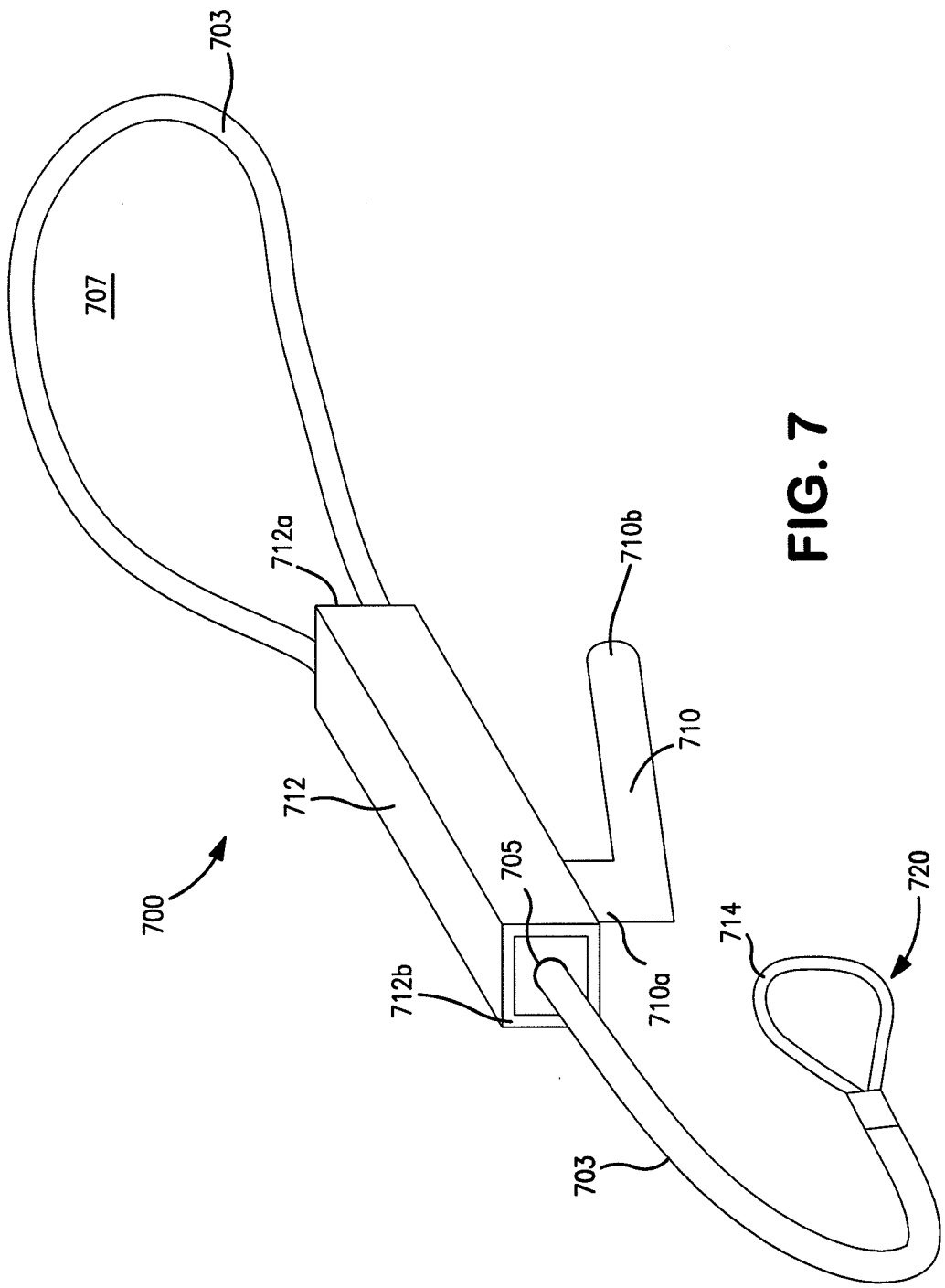
FIG. 7 is a perspective view of yet another embodiment of the present invention.

FIG. 7 is a perspective view of yet another embodiment of the present invention. In this embodiment, the saddle lock 700 comprises an L-shaped hook 701 for fitting around the pommel 102 or horn 205 of the saddle, similarly to the hook 305 of the other embodiments. Further, it comprises a rigid bar 712 from which the L-shaped hook 710 extends. The end of the hook 710b is medial of the base of the hook 710a. A loop of steel 703 cable protrudes from the end 712a of the bar 712. One end of the loop may be permanently and fixedly attached to the bar, such as by welding or forming a loop similar to the loop 714 shown at the other end of the cable, and looped around a staple (not shown) inside of the bar 712 or on the end 712a of the bar 712. The cable 703 extends from the end 712a of the bar 712, forms a loop 707 and then passes back into and through the bar 712 to extend through a hole 705 at the other end 712b of the bar 712. Another loop 714 may be formed at the other end of the cable for allowing the cable 703 to be locked via a padlock or a chain and padlock combination to a stationary object.

A suitable mechanism is provided inside of the bar 712 for allowing the cable 703 to be pulled through hole 705 and be locked to the bar 712 at any one of a plurality of user selectable lengths. In this manner, with the cable 703 unlocked relative to bar 712, the hook 701 can be placed around the pommel or horn of a saddle as previously described with respect to the other embodiments. Then, the length of the loop 707 may be adjusted to make it long enough to fit over the cantle. Finally, the cable 703 may be pulled tight around the cantle and locked to the bar 712 so that the device 700 cannot be removed from the saddle (until the cable 703 is unlocked). The locking mechanism for locking the cable inside the bar 712 can take many forms. For instance, the cable may bear a plurality of circumferential indents around the cable at various longitudinal positions and a dead bolt locking mechanism incorporated directly inside the bar 712 with a bolt that can be extended into the indents on the cable. In yet another embodiment, the cable 703 may be provided with a plurality of holes at different longitudinal positions along the cable 703 and the bar 712 can be provided with at least two longitudinally aligned holes in the bar for allowing the shackle of a padlock to pass through the holes in the bar 712 and a selected one of the holes in the cable 703.

In yet another embodiment, a one-way, releasable ratcheting mechanism can be provided inside the bar so that an individual can release the ratcheting mechanism to allow the loop 707 to be increased in length for fitting around the cantle of a saddle. Then, the ratcheting mechanism can be re-engaged, and the person can pull on the free end 720 of the cable 703 to pull it tight around the cantle, while the ratcheting mechanism prevents the cable 703 from becoming loose again when the pulling force is released. Such an embodiment will permit both hands of the user to be free for purposes of locking the cable 703 in this position, rather than having to use one hand to hold the cable taut around the cantle while trying to lock the cable in this position with the other hand.

Figure 8:
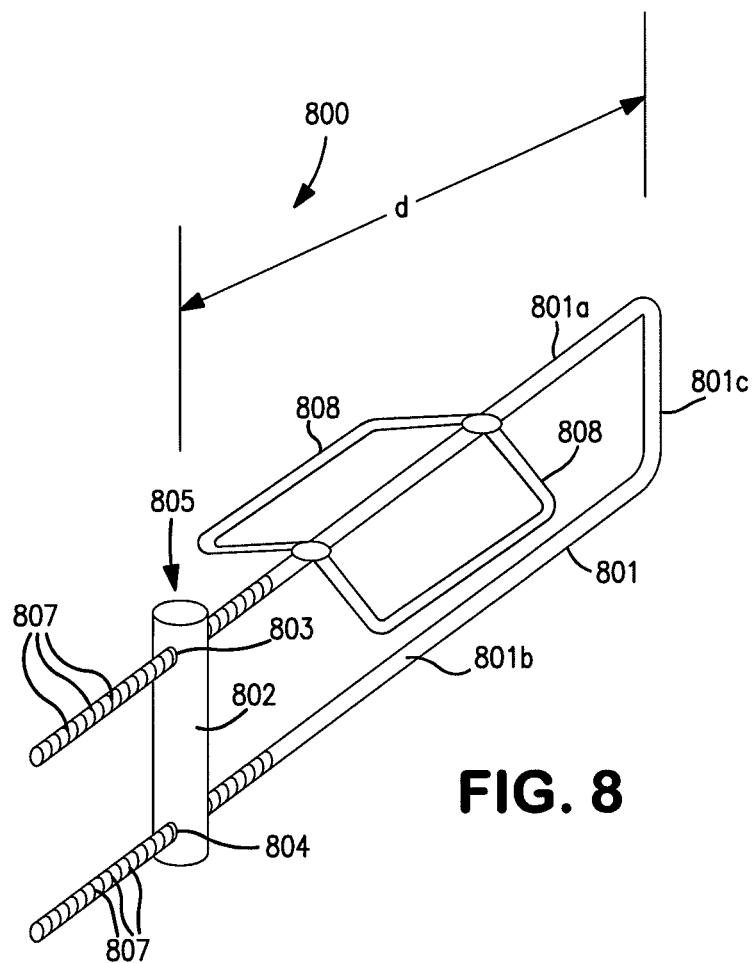
FIG. 8 is a perspective view of one more embodiment of the present invention.

FIG. 8 is a perspective view of one more embodiment 800 of the present invention. This embodiment comprises a large U-bolt 801 with a locking bar 802 with two holes 803, 804 adapted to fit around the two legs 801a, 801b, respectively of the U-bolt, much in the fashion of common bicycle locks. The locking bar is outfitted with a locking mechanism 805 for locking to the U-bolt 801 at different longitudinal positions. For instance, the legs 801a, 801b of the U-bolt may be formed with indents 807 and the locking mechanism 805 may comprise two deadbolts (one for each end of the U-bolt) that engage the indents 807 to lock the locking bar 802 to the U-bolt 801 in one of a plurality of longitudinal positions. The U-bolt 801 (without the locking bar 802 attached) is placed around the saddle so that one of the legs, e.g., leg 801a is above the saddle and the other leg, e.g., leg 801b is beneath the saddle and the device extends longitudinally along the saddle in the center of the saddle where saddles tend to be shortest. Then, the locking bar 802 is slid over the ends of the legs 801a, 801b until the distance, d, between the locking bar 802 and the base 801c of the U-bolt is less than the longer parts of the saddle and locked to the U-bolt in that position.

Since saddles are often made of leather or other somewhat malleable materials and because the longest portion of some saddles is not that much longer than the shorter portion near the lateral center of the saddle, it might be possible to twist the device 800 off of some saddles without causing significant damage to the saddle. In order to prevent this from happening, two wings 808 may be added to one of the legs 801a or 801b that extend laterally outwardly and downwardly to straddle the saddle so that the device 800 cannot be twisted free of the saddle.

Having thus described a few particular embodiments of the invention, various alterations, modifications, and improvements will readily occur to those skilled in the art. Such alterations, modifications and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

The invention claimed is:

1. An apparatus for locking a saddle comprising:
    a first bar having a first longitudinal end and a second longitudinal end, the first bar having a non-circular cross-section and being tubular and hollow to define an elongated internal longitudinal channel, the first bar defining a first plurality of pairs of holes, respective pairs of the first plurality of pairs being spaced longitudinally along the first bar, respective holes of each of the plurality of pairs being positioned opposite one another in transverse alignment about a periphery of the first bar;
    a first hook extending from the first bar, the first hook having a base at which the first hook is attached to the first bar, the first hook extending from the base toward the second longitudinal end of the first bar;
    a fastener extending from the second longitudinal end of the first bar and having a portion having a corresponding non-circular cross-section dimensioned to slide freely in a longitudinal direction along the first bar while maintaining collinear positioning and rotational alignment of the fastener relative to the first bar, the fastener defining a second plurality of pairs of holes, the second plurality of pairs being spaced longitudinally along the fastener, respective holes of each of the plurality of pairs being positioned opposite one another in transverse alignment about a periphery of the fastener, the fastener further defining a rigid structure formed in a loop extending from the second bar, the loop defining a central opening dimensioned to receive a cantle portion of the saddle; and
    a locking mechanism adapted to selectively lock the fastener in one of a plurality of longitudinal positions relative to the first bar;

wherein the first bar and the fastener can be longitudinally translated relative to each other to cause a selected pair of holes of the first bar to longitudinally align with another selected pair of holes of the fastener in selected relative positions of the first bar and the fastener, such that a shackle can be placed simultaneously through the selected pairs of holes to lock the first bar and the fastener to each other in a selected longitudinally-fixed relationship.

2. The apparatus of claim 1 wherein the fastener comprises a second bar and wherein the second bar extends longitudinally adjustably from the first bar.

3. The apparatus of claim 2 wherein the first bar and the second bar are telescopically coupled to each other with one of the first and second bars extendable within the other of the first and second bars.

4. The apparatus of claim 2, wherein the first hook is shaped to define an enclosed space dimensioned to receive a pommel portion or a horn portion of the saddle, and wherein the fastener further comprises a second hook extending from the second bar toward the first hook to define an enclosed space dimensioned to receive a cantle portion of the saddle.

5. The apparatus of claim 1, wherein the first hook is shaped to define a space dimensioned to receive a pommel portion or a horn portion of the saddle.

6. The apparatus of claim 5 wherein the loop extends substantially transversely to the longitudinal dimension.

7. The apparatus of claim 6 wherein the rigid structure is sized and shaped to fit around at least a portion of a cantle of a saddle and has a smaller cross-section than a saddle so that a saddle cannot pass through the loop.

8. The apparatus of claim 1 wherein the first and second bars can be oriented and locked to prevent rotational motion relative to each other in any one of multiple relative angular orientations about a longitudinal axis of the first and second bars, whereby the fastener can be oriented at different angular orientations relative to the first hook about the longitudinal axis.

9. The apparatus of claim 1 wherein one of the first hook and the fastener is adapted to at least partially surround a pommel or a horn of a saddle and the other of the first hook and fastener is adapted to at least partially surround the cantle of a saddle.

10. An apparatus for locking a saddle comprising:
a first elongated bar having a first longitudinal end and a second longitudinal end and a first hook shaped to at least partially surround a seat portion of a saddle, the first hook having a base at which the first hook is attached to the first bar, the hook extending from the base toward the second longitudinal end of the first bar, the first elongated bar having a non-circular cross-section and being tubular and defining an elongated internal channel along substantially all of its length to maintain collinear positioning of the first bar;
a second elongated bar nested within the elongated channel in collinear longitudinal alignment with the first bar, the second bar being longitudinally slidable relative to the first bar within the elongated channel and having a fastener adapted to at least partially surround a second portion of the saddle; and
a locking mechanism adapted to selectively lock the first and second bars to each other in one of a plurality of longitudinal positions relative to each other;
wherein the locking mechanism comprises a plurality of holes defined on the first and second bars, at least one pair of holes being defined on each of the first and second bars, respective holes of each of the pairs being positioned opposite one another about a periphery of a respective one of the first and second bars, a first subset of the plurality of pairs of holes being arranged in longitudinally-spaced relationship in a first rotational orientation, a second subset of the plurality of pairs of holes being arranged in longitudinally-spaced relationship in a second rotational orientation different from the first rotational orientation, the first rotational orientation causing alignment of a set of holes in a first alignment direction, the second rotation orientation causing alignment of a second set of holes in a second alignment direction extending transversely to said first alignment direction;
wherein the nesting of the non-circular cross-sections of the first bar and second bar maintains the first and second bars a selected one of a plurality of alternative rotationally aligned positions of the first and second bars; and
wherein the first bar and the second bar can be longitudinally translated relative to each other to cause a selected pair of holes of the first bar to longitudinally align with another selected pair of holes of the second bar in selected relative longitudinal and rotational positions of the first bar and the second bar, such that a shackle can be placed simultaneously through the selected pairs of holes to lock the first bar and the second bar to each other in a selected longitudinally-fixed and rotationally-fixed relationship, and in a selected one of the first and second rotational orientations, the first and second rotational orientations corresponding to different respective first and second configurations of the apparatus.

11. The apparatus of claim 10 wherein the fastener comprises a rigid structure formed in a loop extending from the second bar, the loop.

12. The apparatus of claim 10 wherein the first and second bars can be oriented and locked relative to each other in any one of multiple relative angular orientations about a longitudinal axis of the first and second bars, whereby the first hook and the fastener can be oriented at different angular orientations relative to each other about the longitudinal axis.

13. The apparatus of claim 10 wherein one of the first hook and the fastener is adapted to at least partially surround a pommel or a horn of a saddle and the other of the first hook and fastener is adapted to at least partially surround at least a cantle of a saddle.

14. An apparatus for locking a saddle comprising:
a first elongated bar having a first longitudinal end and a second longitudinal end, the first elongated bar being tubular and hollow to define an elongated channel along its length;
a hook extending from the first bar, the hook having a base at which the hook is attached to the bar, the hook extending from the base toward the second longitudinal end of the bar, the hook being shaped to define an enclosed space, between the first elongated bar and the hook, that is dimensioned to receive a pommel portion or a horn portion of a saddle;
a second elongated bar nested within the elongated channel to maintain longitudinal alignment of the second elongated bar with the first elongated bar, the second bar being longitudinally slidable relative to the first bar within the elongated channel; and a rigid structure formed in a loop extending from the second bar, the loop being dimensioned to receive a cantle of a saddle; and a locking mechanism adapted to selectively lock the first and second bars to each other in any selected one of a plurality of longitudinal and rotational positions relative to each other.

15. The apparatus of claim 14, wherein, the locking mechanism comprises a plurality of holes located at different longitudinal and rotational positions on one of the first and second bars and at least one hole in the other of the first and second bars, and wherein the first and second bars can be longitudinally slid and rotationally positioned relative to each other to cause the at least one hole to longitudinally align with the hole corresponding to any of the longitudinal and rotational positions such that a shackle can be placed simultaneously through the at least one hole and the hole corresponding to a selected one of the longitudinal and rotational positions to lock the first and second bars in positions that are fixed both longitudinally and rotationally relative to each other.

* * * * *